Oct. 7, 1924.

W. W. PFAUTZ 1,511,002

CONNECTING LOCK

Filed March 29, 1923

W. W. Pfautz, Inventor

By C. A. Snow & Co., Attorneys

Patented Oct. 7, 1924.

1,511,002

UNITED STATES PATENT OFFICE.

WILLIAM W. PFAUTZ, OF LEBANON, PENNSYLVANIA.

CONNECTING LOCK.

Application filed March 29, 1923. Serial No. 628,654.

*To all whom it may concern:*

Be it known that I, WILLIAM W. PFAUTZ, a citizen of the United States, residing at Lebanon, in the county of Lebanon and State of Pennsylvania, have invented a new and useful Connecting Lock, of which the following is a specification.

This invention relates to chain connections, and more particularly connections especially designed for connecting adjacent ends of anti-skid chains or the like.

The primary object of the invention is to provide means whereby slack in a chain may be readily and easily taken up by a slight movement of the connection, due consideration being given to the securing qualities of the connection.

Another object of the invention is to provide a device of this character, whereby various degrees of slack may be compensated for to cause the chain with which the connection is associated, to closely engage the tire on which the chain is positioned.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
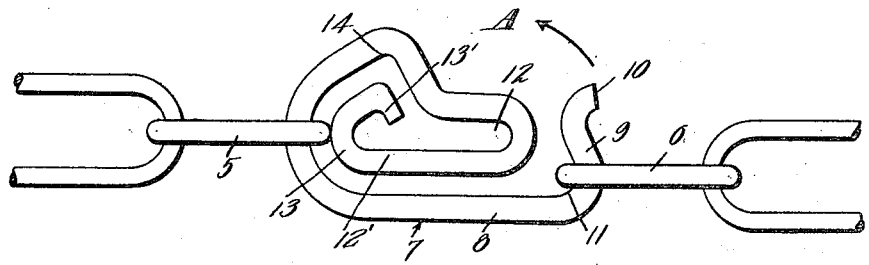
Figure 1 is a side elevational view of the fastener disclosing the same as connected with adjacent ends of a chain.

Referring to the drawing in detail, one end of the chain is indicated by the reference character 5, while the adjacent end thereof, is indicated at 6, the ends having connection with the fastener indicated generally by the reference character 7 as shown by the drawing.

The fastener is formed of a length of metal preferably circular in cross section, and includes a relatively straight portion 8 and an angular end portion 9, the extremity 10 of the end portion 9 being curved outwardly to guide the link to be positioned thereover, to the curved portion 11 of the fastener to hold the link against movement. The opposite end of the fastener is formed into a loop 12, a straight bar 12' and a curved portion 13 to accommodate the opposed end link of the chain to shorten the chain, the extreme inner end of the fastener being formed into a hook 13' to prevent the link from becoming displaced.

An offset portion 14 provides a seat for a link of the chain to further shorten the chain, the offset portions of the fastener being such as to securely hold the links against movement.

Figure 2:
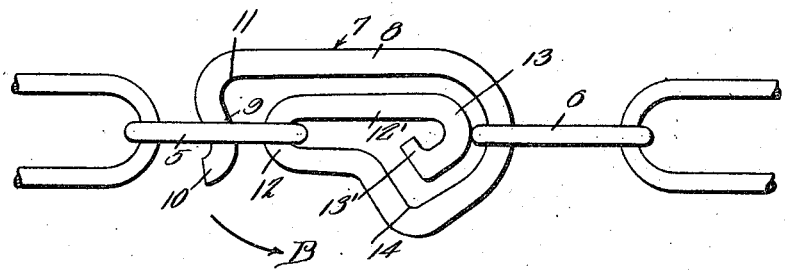
Figure 2 is a side elevational view of a fastener and showing the same moved to one of its positions of adjustment.
Figure 3:
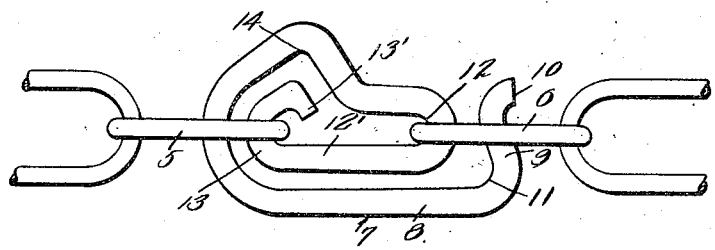
Figure 3 is a side elevational view of the fastener disclosing the same as in another position of adjustment to take up the slot.

From the foregoing it will be seen that by placing the end links of the chain on the fastener in positions as shown by Figure 1 of the drawing, the ends and chain will be secured together and that if it is desired to take up slack in the chain, the fastener, may by swinging the extremity 10 of the fastener in a manner as indicated by the arrow A in Figure 1, move the fastener to bring the end links of the chain to positions as shown by Figure 2 of the drawing, and that by further moving the link in a direction as indicated by the arrow B in Figure 2 of the drawing, the end links of the chain will take a position as shown by Figure 3 of the drawing, thereby moving the end links into closer relation with respect to each other, to tighten the chain on its tire.

What is claimed as new is:—

1. An adjustable fastening member including a length of wire formed with a hook at one end, the length of wire being bent upon itself and formed with a hook member at the opposite end, and said length of wire being provided with offset portions to accommodate end links of a chain.

2. An adjustable fastener including a length of wire having a hook formed at one end, and having a relatively straight portion disposed adjacent to the hook, the length of wire being curved upwardly and inwardly and lying in spaced relation with the relatively straight portion of the length of wire, and said length of wire having a hook member formed at its opposite end.

In testimony that I claim the foregoing as my own, I have hereto affixed my signature in the presence of two witnesses.

WILLIAM W. PFAUTZ.

Witnesses:
H. B. SHARK,
VICTOR GARMAN.